(12) United States Patent
Small

(10) Patent No.: US 9,664,994 B1
(45) Date of Patent: May 30, 2017

(54) CURVILINEAR PROJECTION SCREEN AND ACOUSTIC SYSTEM

(71) Applicant: Dustin Small, Kissimmee, FL (US)

(72) Inventor: Dustin Small, Kissimmee, FL (US)

( * ) Notice: Subject to any disclaimer, the term of this patent is extended or adjusted under 35 U.S.C. 154(b) by 0 days.

(21) Appl. No.: 15/160,690

(22) Filed: May 20, 2016

(51) Int. Cl.
G03B 21/56 (2006.01)
G03B 21/60 (2014.01)
G02B 1/10 (2015.01)
H04R 5/02 (2006.01)
H04R 1/02 (2006.01)

(52) U.S. Cl.
CPC ............. G03B 21/565 (2013.01); G02B 1/10 (2013.01); G03B 21/60 (2013.01); H04R 1/028 (2013.01); H04R 5/02 (2013.01)

(58) Field of Classification Search
CPC .............................. G03B 21/565; G03B 21/56
USPC .................................................. 359/451, 445
See application file for complete search history.

(56) References Cited

U.S. PATENT DOCUMENTS

| | | | |
|---|---|---|---|
| 6,407,798 B2 * | 6/2002 | Graves | G03B 21/56 352/69 |
| 6,665,985 B1 | 12/2003 | Hennes | |
| 6,733,136 B2 | 5/2004 | Lantz et al. | |
| 6,909,543 B2 | 6/2005 | Lantz | |
| 7,106,411 B2 | 9/2006 | Read et al. | |
| 2002/0011380 A1 * | 1/2002 | Alter | G03B 21/56 181/295 |
| 2005/0046938 A1 * | 3/2005 | Hopkins | G03B 21/56 359/443 |
| 2014/0022169 A1 | 1/2014 | Stern et al. | |
| 2015/0146172 A1 | 5/2015 | Maillard et al. | |

* cited by examiner

*Primary Examiner* — Christopher Mahoney
(74) *Attorney, Agent, or Firm* — Allen, Dyer et al.

(57) ABSTRACT

A curvilinear projection screen and acoustic system includes a curvilinear structural frame having a first side and a second side, a plurality of glass fiber reinforced gypsum (GRG) surface panels secured to the first side of the curvilinear structural frame, and a plurality of acoustic panels secured to the first side of the structural frame and interspersed between the plurality of GRG surface panels. In addition, the system includes a projection coating over the pluralities of GRG surface panels and acoustic panels to define a curvilinear projection surface.

20 Claims, 7 Drawing Sheets

CURVILINEAR PROJECTION SCREEN AND ACOUSTIC SYSTEM

TECHNICAL FIELD

The present invention relates to the field of projections screens, and, more particularly, to a curvilinear projection screen and acoustic system.

BACKGROUND

Acoustic systems often use stereophonic reproduction in an attempt to achieve an approximation to spatial reality of sound. For example, two groups of speakers are typically located on either side of a stage at a large stadium for a music concert. However, this orientation provides a poor spatial approximation to the actual performance. In other words, the listeners are not provided with an amplified version of the performance as if they were located in front of the stage and near enough to hear the music live. Instead, the listeners are looking at the performers but hearing the sound from either side of the stage.

Another example is where an audience is being provided with a projected visual image in addition to the audio at a movie theater. It is preferred to approximate spatial reality by having the audio emanate from the projected image that the viewers are observing rather than from the sides.

There have been attempts to address these shortcomings by placing the speakers behind the projection screen itself. However, the projection screen requires perforations in order to allow an adequate portion of the sound to pass through the screen. A shortcoming of the perforated screens is that they limit the high frequency response of the speakers. In addition, the perforated screen must also serve as the projection screen so that the resolution of the image and the percentage of reflected light are undesirably reduced. This shortcoming is particularly exacerbated with large curvilinear projection screens.

Accordingly, what is needed in the art is a curvilinear projection screen and acoustic system that increases the spatial approximation of the sound to the visual image being projected without diminishing the resolution of the image.

SUMMARY

In view of the foregoing background, it is therefore an object of the present invention to provide a curvilinear projection screen and acoustic system.

This and other objects, features, and advantages in accordance with the present invention are provided by a system including a curvilinear structural frame having a first side and a second side, a plurality of glass fiber reinforced gypsum (GRG) surface panels secured to the first side of the curvilinear structural frame, and a plurality of acoustic panels secured to the first side of the structural frame and interspersed between the plurality of GRG surface panels. The system also includes a projection coating over the pluralities of GRG surface panels and acoustic panels to define a curvilinear projection surface.

A method aspect is directed to a method of constructing a curvilinear projection screen and acoustic system including connecting a plurality of vertical metal trusses using a plurality of horizontal wood purlins, and securing a plurality of glass fiber reinforced gypsum (GRG) surface panels to the plurality of horizontal wood purlins, where the GRG surface panels having a curvature defined by an installation location on the curvilinear projection screen. In addition, the method includes forming a plurality of acoustic panels with a randomized perforated portion therein configured to allow sound waves to pass, and securing the plurality of acoustic panels to the plurality of horizontal wood purlins between the pluralities of GRG surface panels. The method also includes installing a projection coating over the pluralities of GRG surface panels and acoustic panels to define a curvilinear and seamless projection surface.

DETAILED DESCRIPTION

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art.

Figure 1:
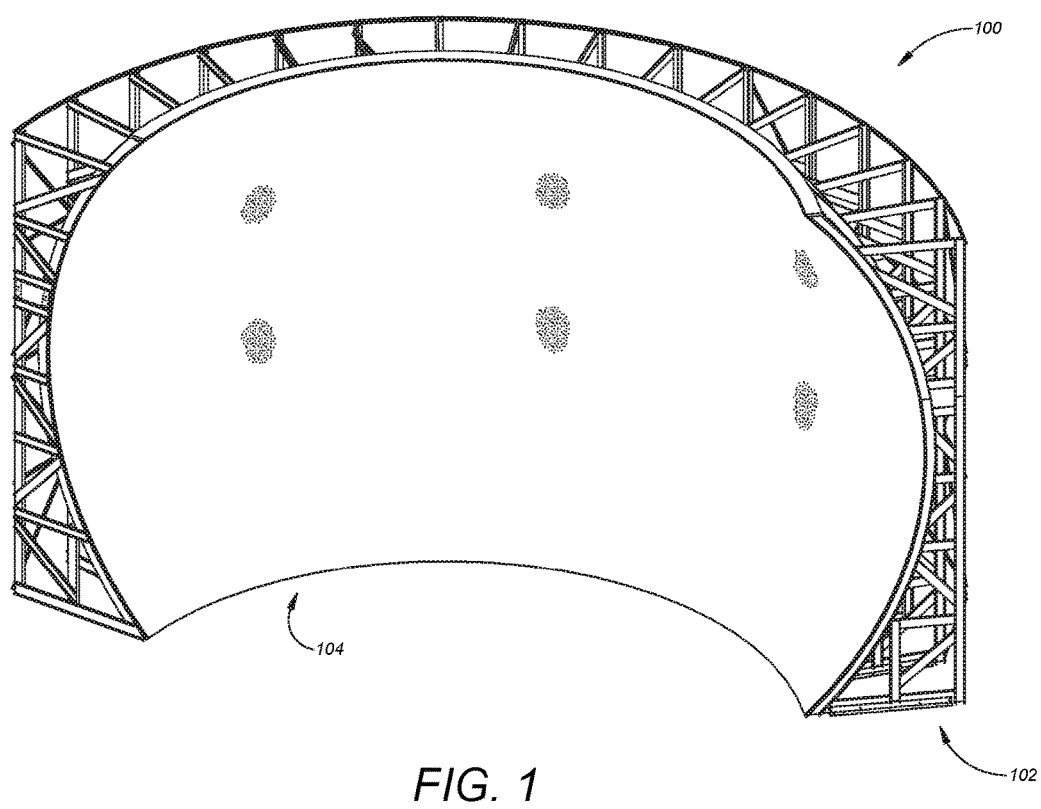
FIG. 1 is front perspective view of the curvilinear projection screen and acoustic system according to an embodiment of the invention.

Referring now to FIG. 1, the curvilinear projection screen and acoustic system 100 generally includes four main components. These components include a curvilinear structural frame 102, a projection screen 104 comprising of glass fiber reinforced gypsum (GRG) panels 112 and acoustic panels (e.g., randomized faded perforated panels) 140, and utilizing a projection coating 105 thereon.

The overall geometric shape of the curvilinear projection screen 104 (e.g., compound curve or curvilinear) is typically determined by a "projection study." The projection study may provide a lens shape, pixel map, lumens, minor radius, major radius, and degrees in plan for a particular application. The particular application could be for a virtual reality type amusement ride, for example. The projection screen 104 may be an up scaled version of the optical characteristics of a lens. There is virtually no limit to size, geometry, shape or orientation in which the projection screen 104 may be orientated to the earth's plane. Most curvilinear projection screens 104 are typically a horizontal/vertical torus (toroidal) or section of a sphere or hemisphere.

Figure 2:
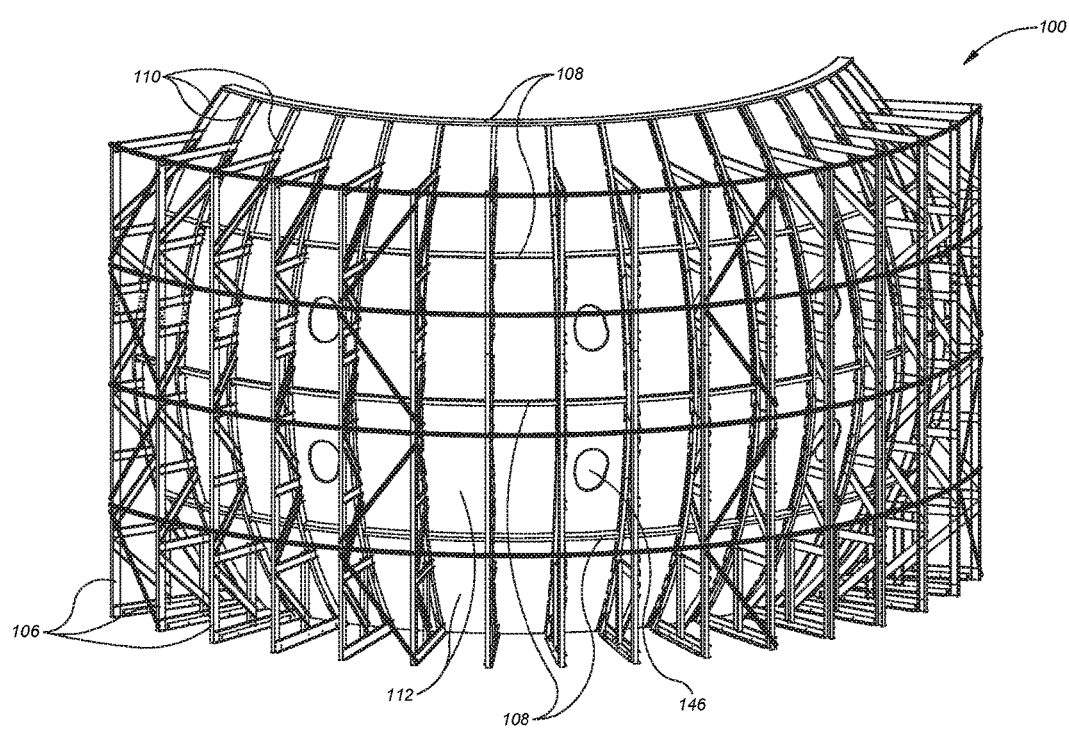
FIG. 2 is a rear perspective view of a curvilinear structural frame of the system shown in FIG. 1.

The curvilinear structural frame 102 includes a series of vertical trusses 106 that are arrayed from the plan radius center point, as shown in FIG. 2. The vertical trusses 106 are typically spaced four feet on center at the equator line of the projection screen 104. The structural framework 102 may include light to medium gauge metal studs/track that overlap one another (web to web connection) to be mechanically fastened with self-drilling screws. The front edges of the vertical trusses 106 include vertical roll chords 110 that are curved to match the section radius of the geometry. The procedure in which the metal track is bent into the vertical roll chords 110 is known as crimp rolling. Crimp rolling is a series of micro crimps that make short facets to produce a desired radius. Horizontal members, identified as purlins 108, connect the vertical trusses 106 together. The purlins 108 are typically three layers (glued and screwed together to make one unit) of CNC cut 1" thick fire rated (FR) plywood. The wood isolates sound from one vertical truss 106 to the next.

When the curvilinear structural frame 102 is complete, there are a series of lines similar to longitude and latitude lines on a globe formed by the vertical trusses 106 and purlins 108. The GRG surface panels 112 overlap onto the vertical and horizontal roll chords and can be mechanically fastened with wood to metal self-drilling screws.

Figure 3:
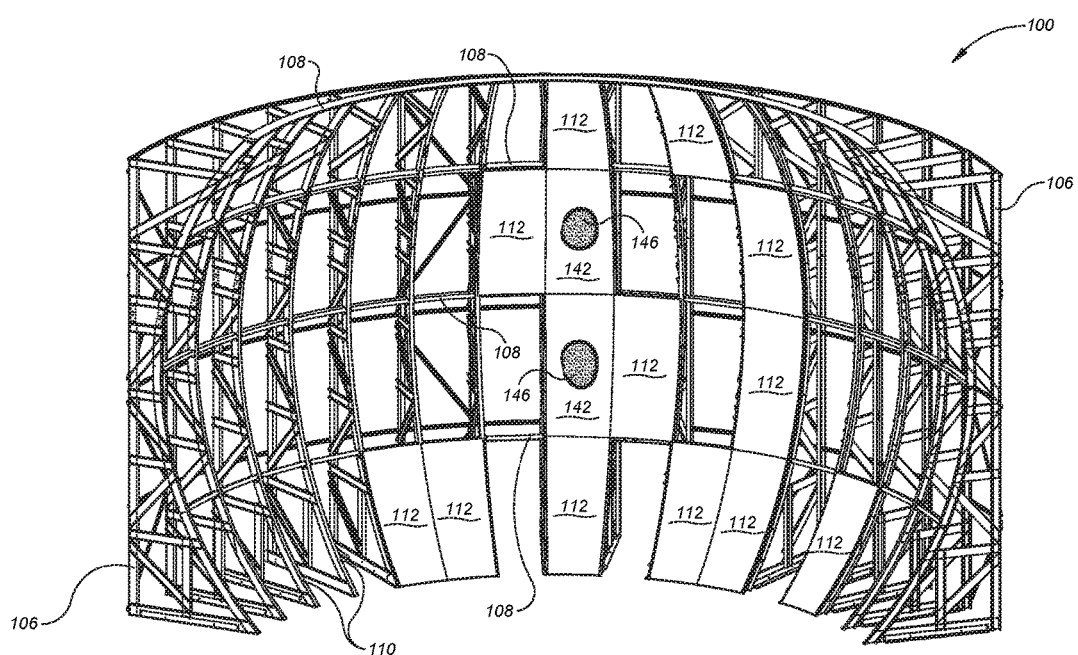
FIG. 3 is a front perspective view of the GRG surface panels being installed on the curvilinear structural frame.

As shown in FIG. 3, the GRG surface panels 112 are being installed on the curvilinear structural frame 102. The horizontal edges 116 and vertical edges of the GRG surface panels 112 are secured to the purlins 108 and to the roll chords 110 of the vertical trusses 106. The acoustic panels 140 are installed to the curvilinear structural frame similarly to that of the GRG surface panels 112. The GRG surface panels 112 may be tapered 118 around the perimeter to allow for finishing compound to be added at the seams (seamless).

Figure 4:
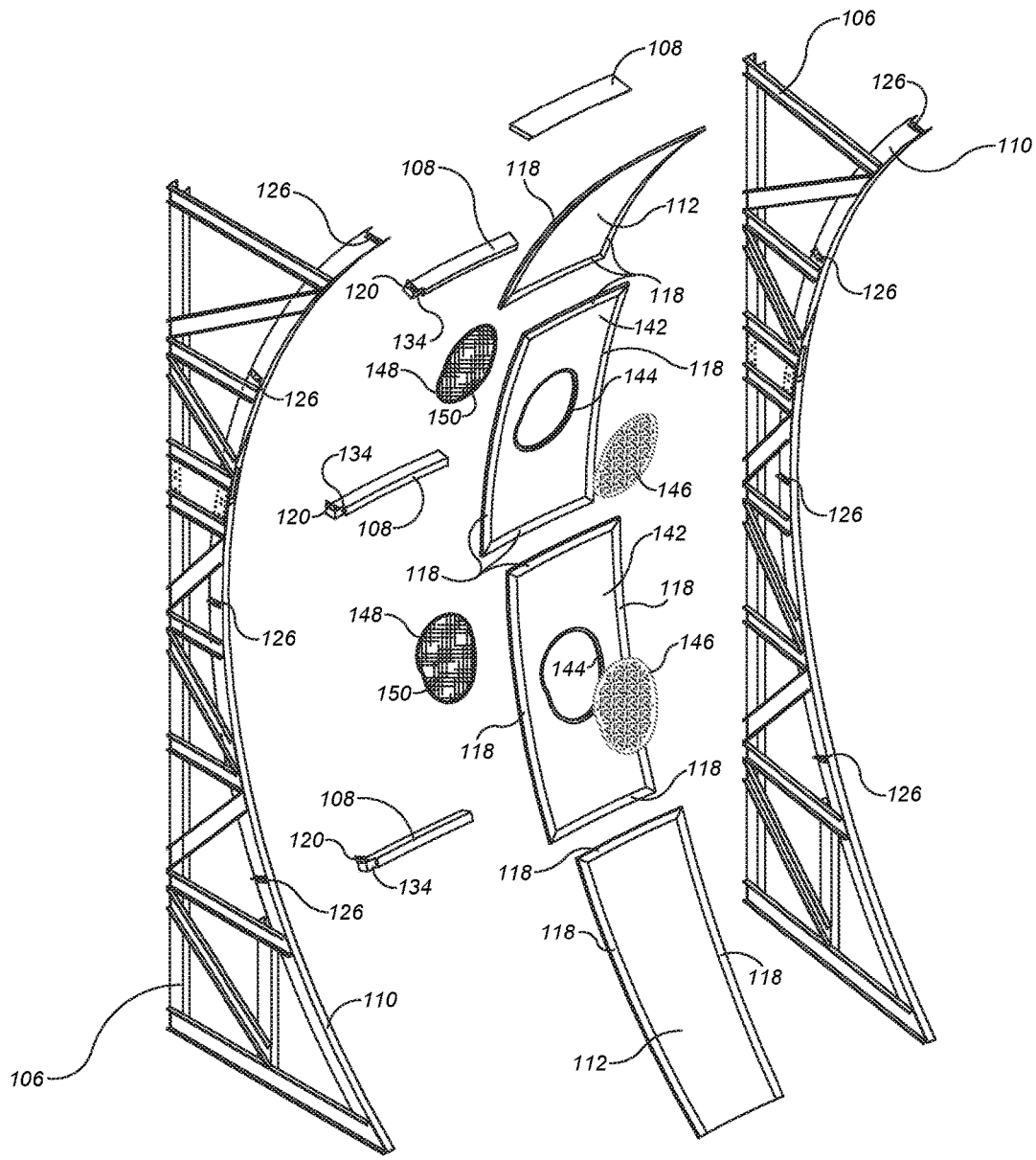
FIG. 4 is an exploded view of the main components of the system.

Referring now to FIG. 4, the GRG surface panels 112 are typically 4' wide×8' tall. The GRG surface panels 112 may be cast in a series of molds (made on a 5-axis CNC machine) with each having a slightly different geometry and shape depending on the install location of the screen geometry. A typical curvilinear projection screen will have approximately 3-6 molds per screen, for a combination typically ranging from 30-160 GRG surface panels 112 and acoustic panels 140 to be assembled for the overall geometry of the projection screen 104.

Figure 5:
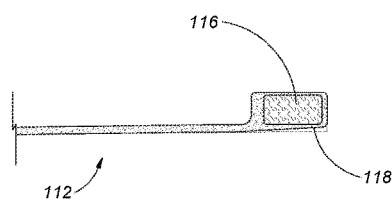
FIG. 5 is a section view of the GRG surface panel.

For example, the perimeter of the GRG surface panels 112 may be approximately 1" thick and include a wood coring material 116 embedded therein to allow for mechanical fastening to the structural framework with minimal tear out as shown in FIG. 5. Approximately 80% of the GRG surface panel 112 towards the center may be approximately ¼" thick with no wood coring. In addition, the GRG surface panels 112 (and acoustic panels 140) may have a slight taper 118 around their perimeter (approximately 3" wide, 2 panels next to each other 6" wide v-groove) to allow for mesh tape and drywall mud finishing compound. CNC cut drywall knives and screeds are produced with the same arc geometry as the projection screen 104 to be finished properly for a constant seamless radius.

Figure 6:
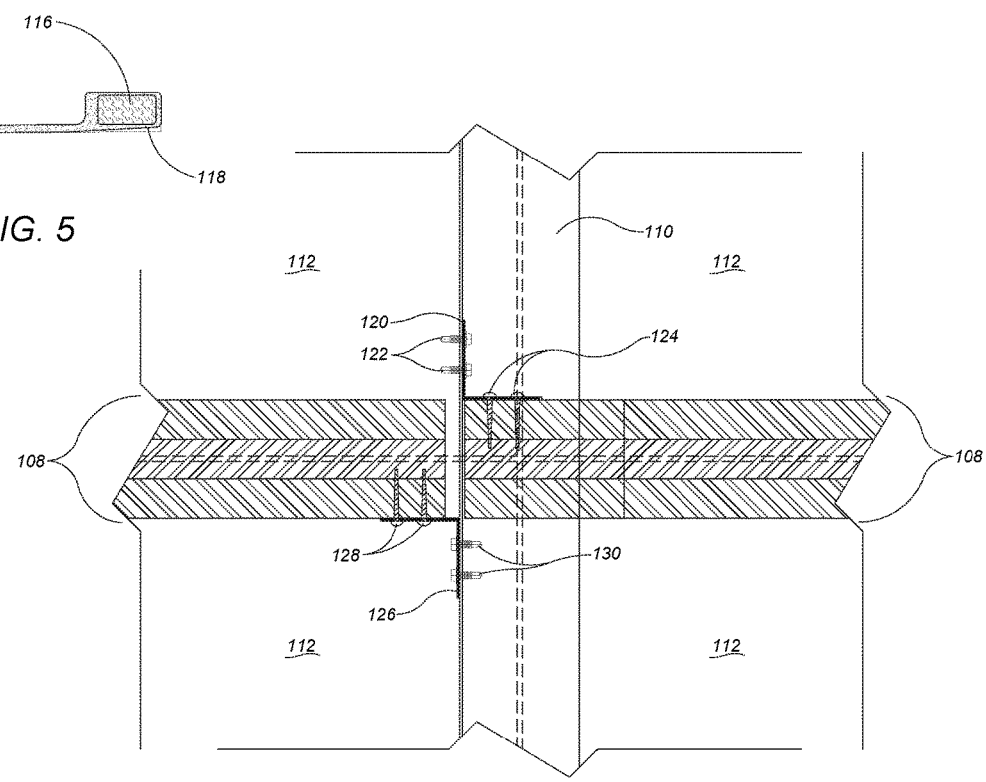
FIG. 6 is a detail front view of the connections of the purlins to the curvilinear structural frame.
Figure 7:
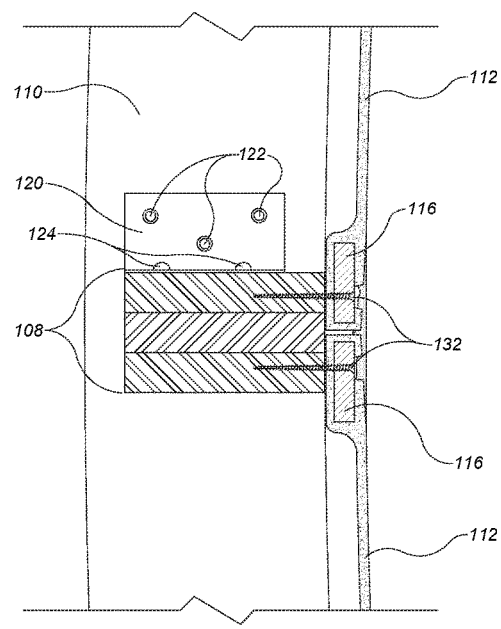
FIG. 7 is a side section view of the connections of the GRG surface panels to the curvilinear structural frame shown in FIG. 6.
Figure 8:
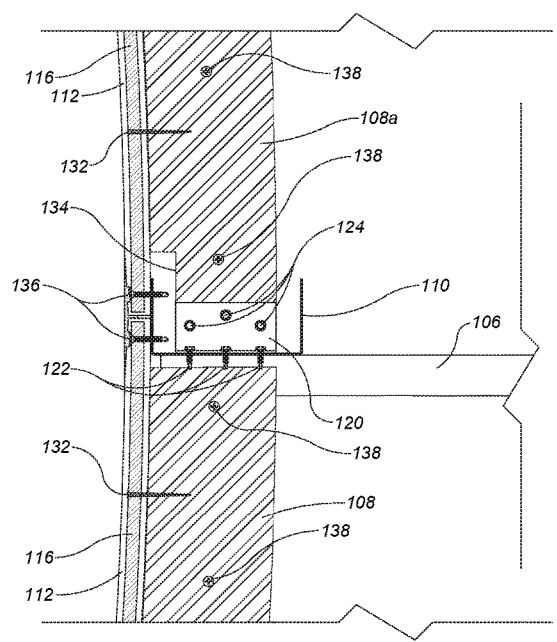
FIG. 8 is a top section view of the connections of the GRG surface panels to the curvilinear structural frame shown in FIGS. 6 and 7.
Figure 9:
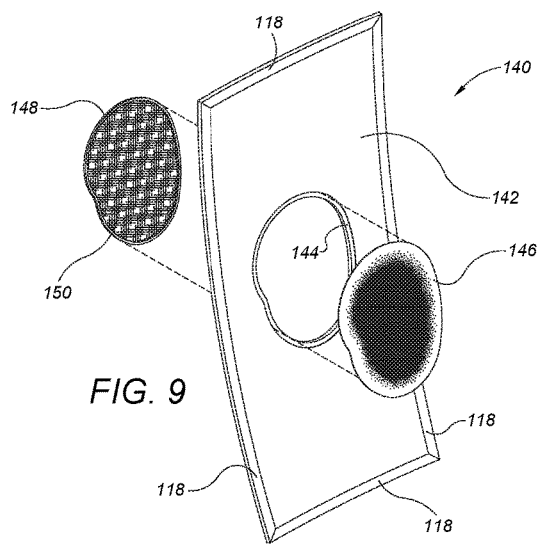
FIG. 9 is an exploded view of an acoustic panel of an embodiment of the invention.
Figure 10:
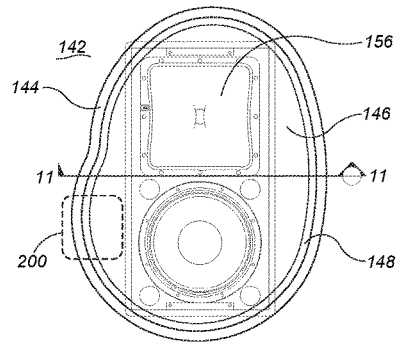
FIG. 10 is a front view of the acoustic panels with a speaker installed.
Figure 11:
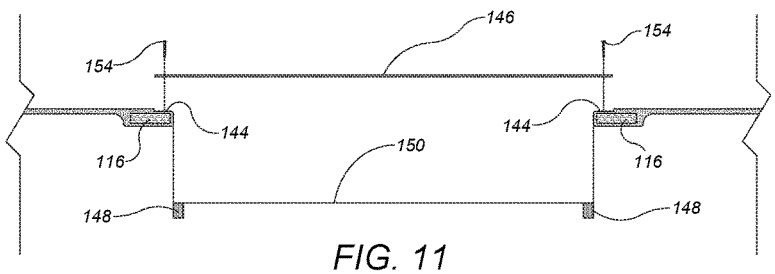
FIG. 11 is an exploded section view of the acoustic panel.
Figure 12:
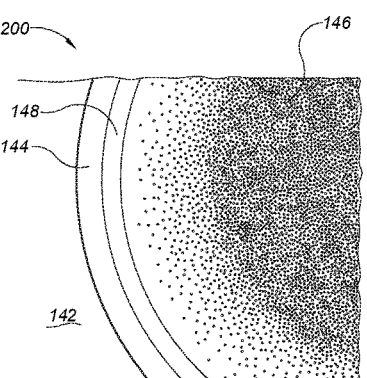
FIG. 12 is a partial detail view of the acoustic panel.

Referring now to FIGS. 6-8, which show exemplary connections of the GRG surface panels 112 and acoustic panels 140 to the curvilinear structural frame 102. FIG. 6 illustrates a front view of the connections of the purlin 108 and adjacent purlin 108a to the curvilinear structural frame 102. This includes a top L-shaped bracket 120 having a first leg being secured to the inside surface of the roll chord 110 with metal screws 122 above a purlin 108, and a second leg secured to a top surface of the purlin 108 using wood screws 124. A bottom L-shaped bracket 126 is connected to an adjacent purlin 108a by first leg secured to the outside surface of the roll chord 110 below the purlin 108 using metal screws 130 and a second leg secured to a bottom surface of the purlin 108 using the wood screws 128.

FIG. 7 is a section view of the same location shown in FIG. 6 showing the connections of the GRG surface panels (and acoustic panels) to the curvilinear structural frame 102. The GRG surface panels 112 are secured to the purlin 108 using wood screws 132 passing through the wood coring material 116 and into the purlin 108. The top L-shaped bracket 120 is also shown in FIG. 7.

FIG. 8 is a top section view of the same location shown in FIGS. 6 and 7. As can be seen in FIG. 8, the GRG surface panels 112 and acoustic panels 140 may be connected to the roll chord 110. The purlin 108a also includes a notch 134 between the inside leg of the roll chord 110 to allow for clearance for the crimps in the roll chord 110. Wood screws 138 are used to secure the layers of the purlins 108, 108a together. Wood to metal screws 136 are used to secure the GRG surface panels 112 and acoustic panels 140 along their respective vertical edges 114 to the roll chord 110.

The acoustic panels 140 shown in FIGS. 9-12 are similar in size and shape to the GRG surface panels 112 described above. An objective of the acoustic panels 140 is for it not to be visible under projection but to allow the passing of sound waves through the projection screen. The acoustic panels 140 include an organically shaped and progressively fading hole pattern or randomized faded perforated portion 146 which makes it difficult for anyone to see under projection, while maintaining high quality sound penetration through the screen surface 104.

The acoustic panels 140 comprise a GRG panel 142 having an aperture therein. A randomized faded perforated portion 146 is installed within the aperture. The randomized faded perforated portions 146 may be produced in a mold similar to the GRG surface panels 112 except they are a different material such as carbon fiber or formed aluminum sheet material. The thickness of the randomized faded perforated portions 146 is an important factor to maintain a range between 60-90 thousands in order to keep the structural integrity due to the thousands of holes in the randomized faded perforated portion 146 but keeping the smooth open cell speaker fabric 150 as close to the backside as possible. The speaker fabric 150 and retaining ring 148 are coated with a higher gain projection coating (+2.0, +2.5 gain) than the surface of the main projection screen 104 to brighten the hole cavities in the randomized faded perforated panel 146 due to light loss and darker shadowing effect that occurs prior to higher gain coating.

After the projection screen 104 is finished (to a level 5 smoothness rating, for example), installation of the projection coating 105 begins. Two or three layers of a high build primer, e.g., a sandable primer, is sprayed onto a front surface of the projection screen 105. Each coat of primer is sanded in-between coats to maintain a smooth finish. The next step is the projection coating 105. Two coats of base and two coats of finish may be sprayed on to the front surface of the projection screen 104 with airless spray rigs. Most projection screens utilize max contrast (0.7 gain) or ultramax contrast (0.5 gain).

Benefits of the curvilinear projection screen and acoustic system includes that it is seamless (high importance), can be a compound curve projection screen, non-combustible materials, high resolution, durable, maintenance friendly, repairs quickly, allows rear mounted speakers (randomized faded speaker perforated panels), passes seismic load analysis, thermal rated, and sound deadening characteristics.

Many modifications and other embodiments of the invention will come to the mind of one skilled in the art having the benefit of the teachings presented in the foregoing descriptions and the associated drawings. Therefore, it is understood that the invention is not to be limited to the specific embodiments disclosed, and that modifications and embodiments are intended to be included within the scope of the appended claims.

That which is claimed is:

1. A curvilinear projection screen and acoustic system comprising:
   a curvilinear structural frame having a first side and a second side;
   a plurality of glass fiber reinforced gypsum (GRG) surface panels secured to the first side of the curvilinear structural frame;
   a plurality of acoustic panels secured to the first side of the structural frame and interspersed between the plurality of GRG surface panels; and
   a projection coating over the pluralities of GRG surface panels and acoustic panels to define a curvilinear projection surface.

2. The curvilinear projection screen and acoustic system of claim 1, wherein the curvilinear projection surface is seamless.

3. The curvilinear projection screen and acoustic system of claim 1, wherein each acoustic panel comprises a GRG panel having a randomized perforated portion therein configured to allow sound waves to pass.

4. The curvilinear projection screen and acoustic system of claim 3, wherein the randomized perforated portion comprises carbon fiber.

5. The curvilinear projection screen and acoustic system of claim 3, wherein the projection coating over the randomized perforated portion having a higher gain than over a remaining portion of the acoustic panel.

6. The curvilinear projection and acoustic system of claim 3, wherein the randomized perforated portion comprises hydro formed aluminum sheeting.

7. The curvilinear projection and acoustic system of claim 3, wherein the randomized perforated portion comprises hydro formed aluminum sheeting.

8. The curvilinear projection and acoustic system of claim 3, further comprising a speaker installed behind the randomized perforated portion.

9. The curvilinear projection screen and acoustic system of claim 1, wherein each GRG surface panel and acoustic panel having a curvature defined by an installation location on the curvilinear structural frame.

10. The curvilinear projection screen and acoustic system of claim 1, wherein the curvilinear structural frame comprises a plurality of vertical trusses connected together by a plurality of horizontal purlins.

11. The curvilinear projection screen and acoustic system of claim 10, wherein the plurality of horizontal purlins comprises wood configured to isolate sound from adjacent vertical trusses.

12. The curvilinear projection and acoustic system of claim 10, wherein the plurality of vertical trusses comprises metal.

13. The curvilinear projection screen and acoustic system of claim 1, wherein the pluralities of GRG surface panels and acoustic panels are cast in a plurality of molds, each mold having a different geometry and shape determined by an installation location on the curvilinear structural frame.

14. The curvilinear projection screen and acoustic system of claim 1, wherein the pluralities of GRG surface panels and acoustic panels each comprising a taper around a perimeter filled with drywall compound to create a seamless joint between adjacent GRG surface panels and acoustic panels.

15. The curvilinear projection screen and acoustic system of claim 1, wherein the pluralities of GRG surface panels and acoustic panels having a wood coring material embedded along a perimeter for mechanical fastening to the curvilinear structural frame.

16. The curvilinear projection screen and acoustic system of claim 1, wherein a thickness of the plurality of GRG surface panels is reduced at a center portion thereof.

17. A curvilinear projection screen and acoustic system comprising:
   at least one acoustic panel comprising a glass fiber reinforced gypsum (GRG) panel having a randomized perforated portion therein configured to allow sound waves to pass;
   a projection coating over the at least one acoustic panel to define a projection surface; and
   the at least one acoustic panel having a geometry and shape determined by an installation location on the projection surface.

18. The curvilinear projection screen and acoustic system of claim 17, further comprising:
   a plurality of vertical metal trusses;
   a plurality of horizontal wood purlins connecting the plurality of vertical metal trusses;
   a plurality of GRG surface panels secured to the plurality of horizontal wood purlins and having a curvature defined by an installation location on the curvilinear structural frame;
   the at least one acoustic panel secured to the plurality of horizontal wood purlins and interspersed between the plurality of GRG surface panels; and
   wherein each of the randomized perforated portions of the plurality of acoustic panels are resin infused in a mold.

19. The curvilinear projection screen and acoustic system of claim 17, wherein the randomized perforated portion of the at least one acoustic panel being resin infused.

20. A method of constructing a curvilinear projection screen and acoustic system comprising:
   connecting a plurality of vertical metal trusses using a plurality of horizontal wood purlins;
   securing a plurality of glass fiber reinforced gypsum (GRG) surface panels to the plurality of horizontal wood purlins, the GRG surface panels having a curvature defined by an installation location on the curvilinear projection screen;
   forming a plurality of acoustic panels with a randomized perforated portion therein configured to allow sound waves to pass;
   securing the plurality of acoustic panels to the plurality of horizontal wood purlins between the plurality of GRG surface panels; and
   installing a projection coating over the pluralities of GRG surface panels and acoustic panels to define a curvilinear and seamless projection surface.

* * * * *